United States Patent [19]
Jacob et al.

[11] 4,368,857
[45] Jan. 18, 1983

[54] FISHING REEL DRAG

[75] Inventors: Lionel C. Jacob; G. Wirth Yarborough, both of Mobile, Ala.

[73] Assignee: Cool Spool, Inc., Mobile, Ala.

[21] Appl. No.: 223,807

[22] Filed: Jan. 9, 1981

[51] Int. Cl.³ .................... A01K 89/01; A01K 89/02
[52] U.S. Cl. ............................................. 242/84.5 A
[58] Field of Search ............... 242/84.51 R, 84.51 A, 242/84.5 R, 84.5 A, 84.21 R, 99; 254/351, 368

[56] References Cited

U.S. PATENT DOCUMENTS

| | | | |
|---|---|---|---|
| 1,727,750 | 9/1929 | Cox et al. | 254/351 |
| 2,344,209 | 3/1944 | Lowe | 242/84.21 R |
| 2,690,309 | 9/1954 | Cuonz et al. | 242/84.21 R |
| 2,705,113 | 3/1955 | Bonanno | 242/84.21 R |
| 2,863,617 | 12/1958 | Chapin et al. | 242/84.21 R |
| 3,027,113 | 3/1962 | Berger et al. | 242/84.21 R |
| 3,144,217 | 8/1964 | Wood, Jr. | 242/84.21 R |
| 3,946,963 | 3/1976 | Oberg | 242/84.51 A |
| 4,153,219 | 5/1979 | Kamikawa | 242/84.51 R |

*Primary Examiner*—Billy S. Taylor
*Attorney, Agent, or Firm*—Ziems and Walter

[57] ABSTRACT

A drag mechanism for a fishing reel includes a frustoconical brake element having a large surface area and a brake drum having a correspondingly large complementary surface in frictional contact with the frustoconical brake element. The brake drum is urged with variable force against the frustoconical brake element by engagement with a threaded adjustment member which is threadedly received on a shaft of the reel. The frustoconical brake element and the brake drum are sized to be received within a recess defined by a flange at the end of the line spools of conventional fishing reels.

6 Claims, 4 Drawing Figures

FISHING REEL DRAG

BACKGROUND OF THE INVENTION

This invention relates to fishing reels and, more particularly, to a brake or drag for the line spool of a fishing reel.

In typical prior art fishing reels, of which the fishing reel disclosed in U.S. Pat. No. 4,196,869 issued Apr. 8, 1980 to Shepherd is an example, a brake or drag is provided for the line spool which includes a number of small annular elements contained within the hub of the spool and arranged to be pressed into frictional contact with the interior surfaces of the spool. Because of the relatively small size of the drag elements in comparison with the size of the spool, and because of the materials normally used for the drag elements, relatively large pressures have had to be applied over the area of engagement between the brake elements and the spool. As a result, when the spool has been caused to rotate by forces exceeding the holding force of the drag, as when the force of a fish running with the fishing line has caused the rotation of the spool, a substantial heat build-up has occurred.

SUMMARY OF THE INVENTION

In accordance with the present invention, a highly effective fishing reel drag is provided which results in exceptionally cool operation of the fishing reel. The drag mechanism includes a thin, hollow frustoconical brake disc which is sized to be received within a recess defined in a conventional line spool. The frustoconical disc presents a large surface area for frictional engagement by a correspondingly large complementary surface on a non-rotatable brake drum. The drag force on the line spool is variable by the manipulation of an adjustment member which abuts the brake drum and forces it into frictional contact with the frustoconical brake disc by means of its own threaded engagement with a shaft on which the spool is mounted.

The large area of frictional contact coupled with a large moment arm through which the drag acts to retard the spool reduces the amount of pressure required between the frictionally engaging surfaces. The lower pressure, the thinness of the brake disc and the location of the drag mechanism outside of the line spool hub and exposed to the atmosphere prevent heat build-up and result in cool operation of the reel.

The drag mechanism according to the present invention is well suited for incorporation into present manufacturing procedures for making and assembling fishing reels. The drag mechanism is also suitable for mounting on existing fishing reels.

DETAILED DESCRIPTION OF THE PREFERRED EMBODIMENTS

Figure 1:
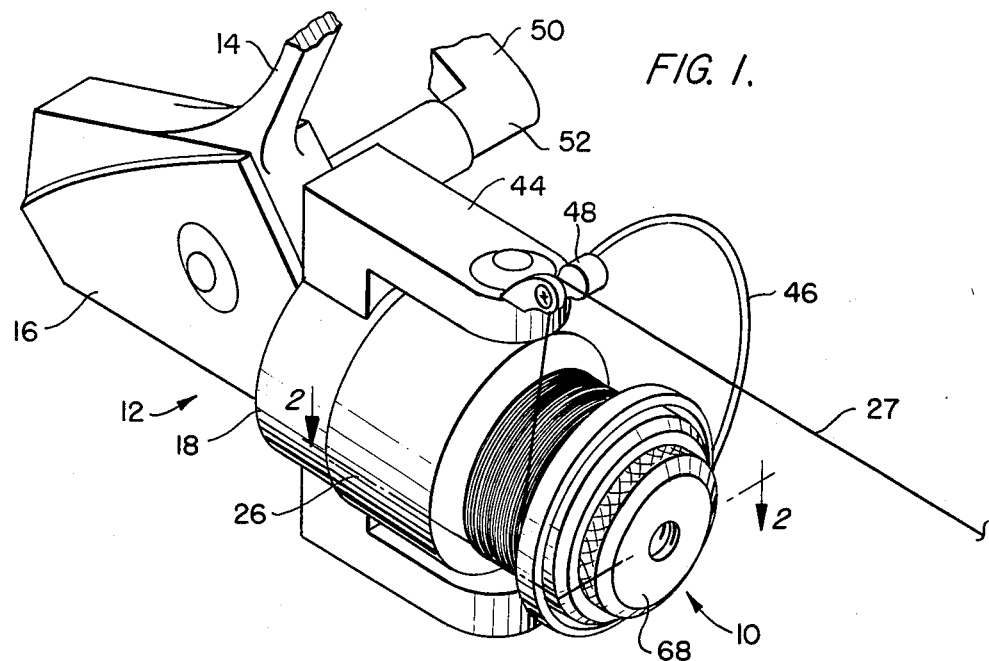
FIG. 1 is a perspective view of a fishing reel employing the drag mechanism according to the present invention.
Figure 2:
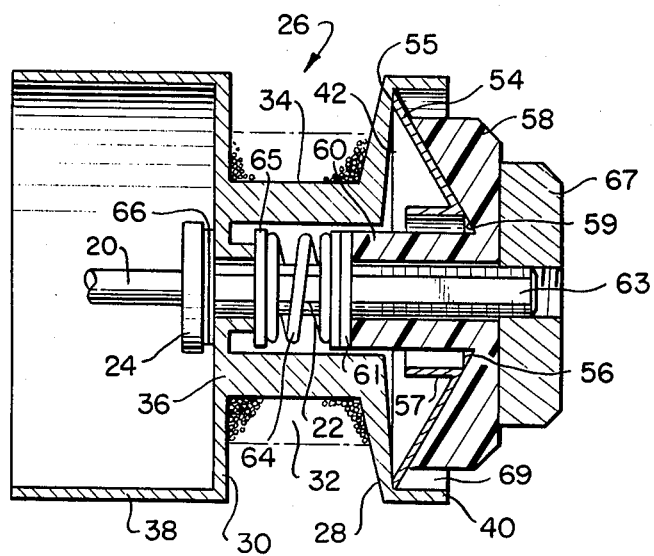
FIG. 2 is a cross-section along the line 2—2 of FIG. 1.

In the accompanying drawings and as best illustrated in FIGS. 1 and 2, the fishing reel drag or brake according to the present invention is designated generally by the numeral 10 and is shown as incorporated in a fishing reel 12 of the open face spinning variety. The reel 12 is intended to be mounted beneath the handle of a rod in conventional fashion by an elongated curved mounting shoe positioned at the free end of a spacing leg 14, a portion of which is shown extending from the reel housing 16. A flyer 18 is rotatably mounted around a shaft 20 extending from the reel housing 16. A threaded extension shaft 22 having a flange 24 at one end thereof is secured to the end of the shaft 20, with the flanges 24 being adjacent to the end of the shaft 20. A line spool 26, around which a fishing line 27 is wound, is mounted on the extension shaft 22. The line spool 26 comprises axially spaced, radially extending front or outboard and rear or inboard flanges 28 and 30, respectively, which define a line receiving annular recess 32. The radially innermost extent of the recess 32 is defined by a cylindrical outer surface 34 of a hub 36 of the line spool 26. An annular skirt 38 defines the radially outer periphery of the rear flange 30 and extends toward the flyer 18. A second annular skirt 40 defines the radially outer periphery of the front flange 28 and extends forwardly to define a circular recess 42. As is customary, a line pick-up and turning mechanism 44 is connected to the flyer 18 and includes a bail 46 and a line-engaging element 48. The line pick-up and turning mechanism 44 rotates around the line spool 26, while the line-engaging element 48 winds the fishing line 27.

Operation of the reel 12 is effected by manipulation of a handle supported on one end of a crank arm 50, a portion of which is illustrated in FIG. 1. The other end of the crank arm 50 is affixed to a crank shaft 52 which is rotatably received in the reel housing 16. Movement of the crank arm 50 causes rotation of the flyer 18 and the line pick-up and turning mechanism 44 around the line spool 26, while the line spool 26 reciprocates along the axis of rotation of the flyer 18. As a result, the flyer 18, through the line-engaging element 48, retrieves the fishing line 27 and winds it evenly onto the line spool 26.

The reel 12 normally has a mode of operation in which the line pick-up and turning mechanism 14 is disposed in a position where it is least likely to interfere with the fishing line 27 during the casting process. In such a position, the fishing line 27 will uncoil axially from the line spool 26 without interference. Upon completion of the cast, line retrieval is accomplished by forward rotation of the crank arm 50.

In another mode of operation, the flyer 18 is maintained in a stationary position either by the fisherman's hand or by an anti-reverse mechanism, as is commonly employed on such reels. The line spool 26 is normally restrained from rotation around the extension shaft 22 by the adjustable brake or drag mechanism 10 of the present invention. By such an arrangement, the line spool 26 is selectively restrained from rotation by a variable amount of force and is permitted to rotate with respect to the shaft 22 when the force in the fishing line 27 exceeds the drag force, so that a fish may run with the line without breaking it. Thus, the brake or drag mechanism 10 protects the line under such circumstances, but at the same time, the rotation of the line spool 26 against the drag of the drag mechanism will tend to generate substantial heat.

Figure 3:
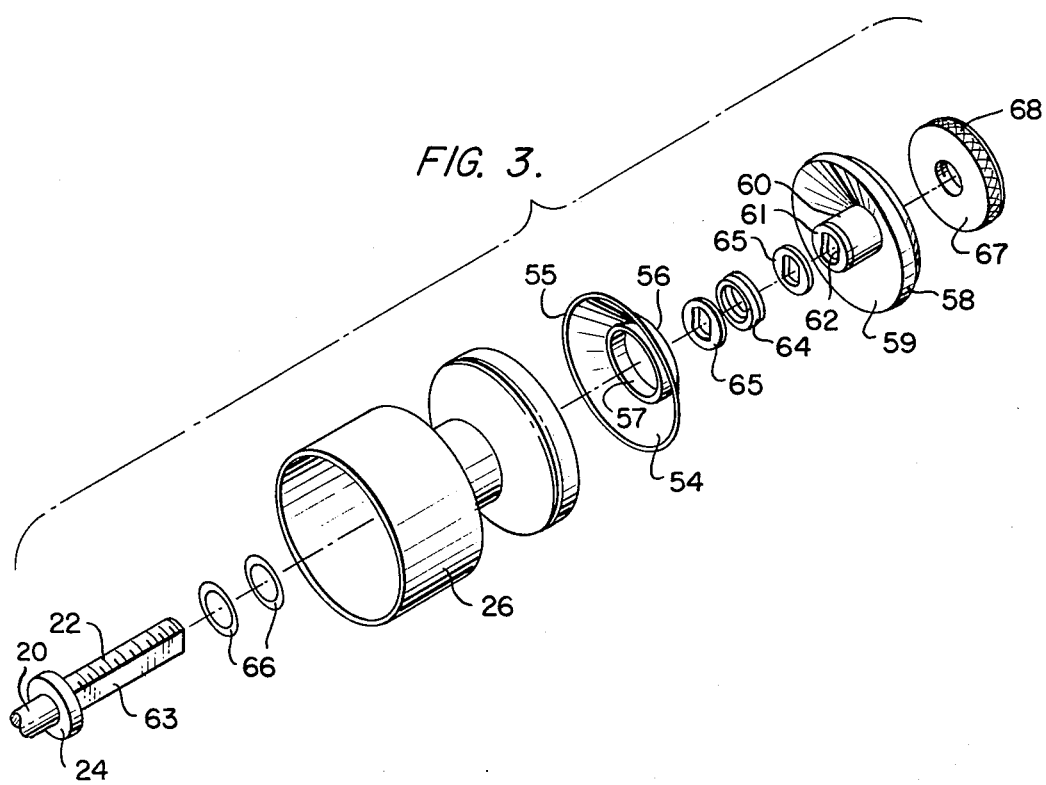
FIG. 3 is an exploded perspective view of the drag mechanism in association with a line spool and shaft.

As is best illustrated in FIGS. 2 and 3, the brake or drag mechanism 10 according to the present invention includes a thin, hollow brake element in the form of a frustoconical brake disc 54 having a central aperture defined therein. The frustoconical brake disc 54 has a large surface area and at one end, a major, outer peripheral rim 55 having a relatively large diameter sized to be received within the recess 42 of a standard line spool. It is contemplated that many methods of affixing the frustoconical brake disc 54 to the line spool 26 within the recess 42 are suitable. For example, the frustoconical brake disc 54 can be glued within the recess 42, or some interlocking mechanism can be provided to prevent relative rotation between the frustoconical brake element 54 and the line spool 26, such as a detent or complementary serrations on the major rim 55 of the frustoconical brake disc 54 and within the recess 42.

On the opposite end of the frustoconical brake disc 54 is a minor rim 56 of relatively small diameter, positioned distal to the line spool 26. The orientation of the minor rim 56 distal to the flange 28 defines a chamber between the hollow frustoconical brake disc 54 and the flange 28 which aids in the dissipation of heat from the brake disc 54. A collar 57 extends from the minor rim 56 toward the major rim 55.

The drag mechanism 10 also includes a non-rotatable brake drum 58 in the shape of a disc which has one flat side and a recess on the other side to define a frustoconical friction surface 59 having a shape complementary to the shape of the frustoconical brake disc 54 and a surface area corresponding in size to that of the brake disc 54. The brake drum 58 also includes a hub 60 defining a central aperture and extending from the flat side of the disc to well beyond the other side. The central aperture of the hub 60 is sized to fit easily over the threaded extension shaft 22, and the end of the hub 60 carries a torque ring 61 of hard material, such as stainless steel. The torque ring 61 defines an opening having the same diameter as that of the central aperture of the hub 60, but also having two flat sides 62 which make the area of the torque ring opening smaller than the area of the central aperture of the hub 60. The flat sides 62 cooperate with two flat sides 63 provided on the threaded extension shaft 22 to prevent relative rotation between the shaft 22 and the brake drum 58. The hub 60 extends through the central aperture of the frustoconical brake disc 54 into the hub 36 of the line spool 26, where it is biased by a coil spring 64 through suitable washers 65 away from the frustoconical brake disc 54. Other washers 66 are provided between the flanges 24 and the line spool 26. A threaded drag adjustment member 67 engages a face of the brake drum 58 opposite the frustoconical surface thereof to force the drum 58 into frictional contact with the frustoconical brake disc 54 against the bias of the spring 64. Rotation of the threaded adjustment member 67 on the threaded extension shaft 22 causes the reciprocation of the brake drum 58 axially in and out along the extension shaft 22. In the drawing figures, the drag adjustment member 66 is shown as a circular element which includes a knurled circumferential surface 68. It is understood, however, that the drag adjustment member 67 can take other forms, such as that of a triangle.

As is illustrated in FIG. 2, the brake drum 58 has a smaller diameter than the frustoconical bake disc 54, thereby defining an annular space 69 between the periphery of the brake drum 58 and the annular skirt 40 of the line spool 26. As a result, an annular portion of the frustoconical brake disc 54 is exposed directly to the atmosphere. Thus, the annular space 69 aids in allowing the frustoconical brake disc 54 to dissipate heat. Furthermore, the frustoconical shape of the frictionally engaging surfaces permits a larger brake area to be employed within a specific size recess than is possible with flat surfaces.

Figure 4:
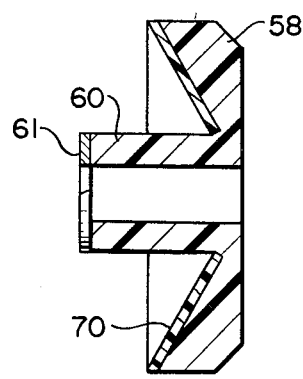
FIG. 4 is a cross-section of an alternate form of brake drum.

The frustoconical brake disc 54 is preferably made of a corrosion-resistant material such as stainless steel. The brake drum 58 is made of a material that can sustain a high heat, for example, polytetrafluoethylene, commercially available under the name Teflon. It is also contemplated, as illustrated in FIG. 4, that, in the alternative, the brake drum 58 can be made of ABS or polypropylene material which includes a Teflon liner 70 bonded or otherwise suitably affixed to the brake drum 58 to define a frustoconical friction surface. It is further contemplated that the friction surface can be a coating or can take other forms.

Although the foregoing discloses particular modes of embodying the present invention, it will be apparent from the preceding description that modifications and/or changes may be made without departure from the present invention. For example, although the specific embodiment described herein is applied to open face spinning reels, it is understood that the principles of the invention can be applied to fishing reels of other types. Accordingly, it is expressly intended that the foregoing description and accompanying drawings are illustrative only, not limiting, and that the true spirit and scope of the present invention is to be determined by reference to the appended claims.

What is claimed is:

1. In a fishing reel having a spool including a hub with axially spaced inboard and outboard flanges to define an annular line storage recess, the reel also having a shaft concentric with and extending through said hub, said spool being rotatable relative to said shaft, an improved drag mechanism for restraining relative rotation of said spool and said shaft, said drag mechanism comprising:

a first brake element defining a central aperture and having an exterior frustoconical friction surface to provide said first element with opposite major and minor ends of relatively large and small diameters, respectively, said major end of said first element being secured to said outboard spool flange for rotation with said spool;

a second brake element secured against rotation relative to said shaft and having an interior frustoconical friction surface complementary to the shape of the friction surface on said first brake element, said second brake element including a hub extending through the central aperture of said first brake element; and adjustable means for urging the friction surfaces of said first and second brake elements into contact with each other.

2. The drag mechanism of claim 1, wherein said first brake element is hollow.

3. The drag mechanism of claim 1, wherein said second brake element is formed from a high strength plastic material and the friction surface thereof is a surface on polytetrafluoroethylene.

4. The drag mechanism of claim 3, wherein the friction surface is a liner affixed to the high strength plastic material.

5. The apparatus recited in claim 1 wherein said outboard flange includes an axially projecting annular skirt at the periphery thereof, the major end of said first brake element fitting snugly within said skirt.

6. The drag mechanism of either claims 1 or 3 wherein said first brake element is hollow and formed of material having the characteristics of stainless steel.

* * * * *